April 21, 1959  D. W. GAGLE ET AL  2,882,714
LAMINATED INTERLOCKING BLOCK

Filed Oct. 14, 1955  4 Sheets-Sheet 1

INVENTORS
D.W. GAGLE
C.G. GOSS
W.R. BOWLES
BY Hudson & Young
ATTORNEYS

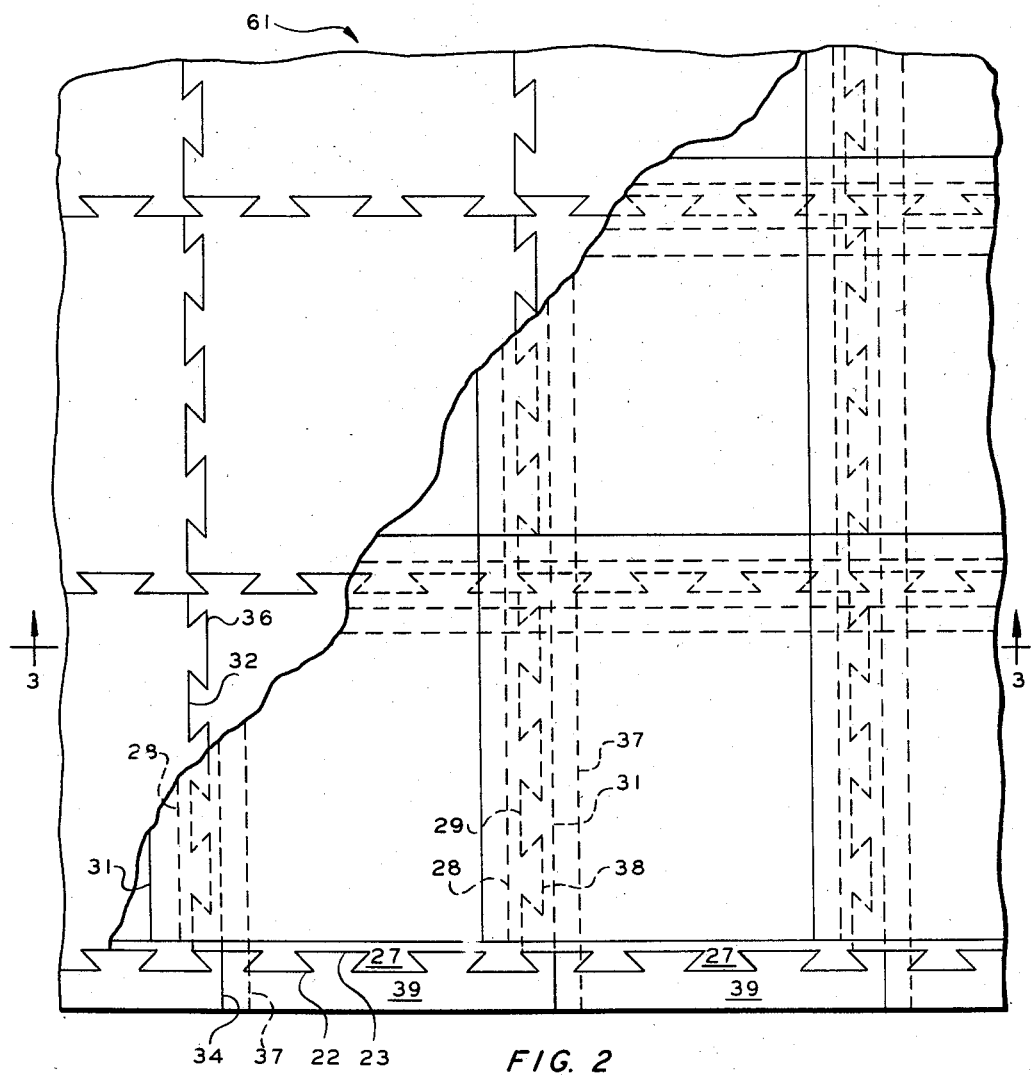
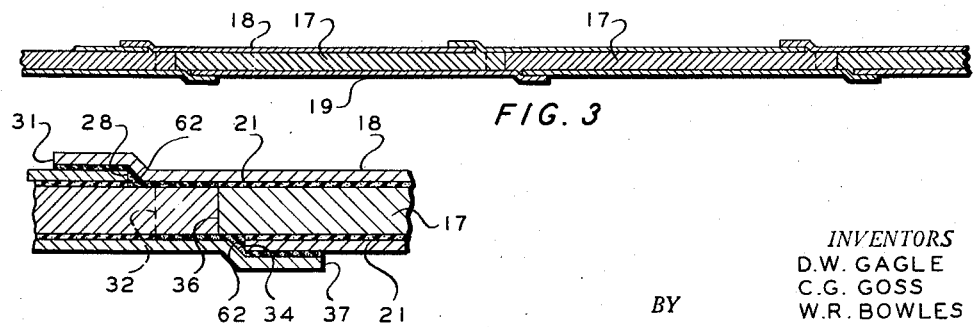
FIG. 2
FIG. 3
FIG. 4
INVENTORS
D.W. GAGLE
C.G. GOSS
W.R. BOWLES
ATTORNEYS April 21, 1959 D. W. GAGLE ET AL 2,882,714
LAMINATED INTERLOCKING BLOCK
Filed Oct. 14, 1955 4 Sheets-Sheet 3

INVENTORS
D.W. GAGLE
C.G. GOSS
BY W.R. BOWLES

Hudson & Young
ATTORNEYS

April 21, 1959

D. W. GAGLE ET AL 2,882,714

LAMINATED INTERLOCKING BLOCK

Filed Oct. 14, 1955

INVENTORS
D.W. GAGLE
C.G. GOSS
W.R. BOWLES

BY Hudson & Young

ATTORNEYS

United States Patent Office 2,882,714
Patented Apr. 21, 1959

2,882,714

LAMINATED INTERLOCKING BLOCK

Duane W. Gagle, Charles G. Goss, and William R. Bowles, Bartlesville, Okla., assignors to Phillips Petroleum Company, a corporation of Delaware Application October 14, 1955, Serial No. 540,412

8 Claims. (Cl. 72—25)

This invention relates to prefabricated, interlocked construction material. In one aspect it relates to prefabricated, interlocking construction blocks having sides thereof provided with alternating tenons and recesses, a plurality of which may be arranged in interlocking association between two layers of fluid impervious material to form a tight, fluid impervious prefabricated lining. In another aspect it relates to a method for assembling such blocks to provide a fluid impervious lining.

Though prefabricated construction materials with interlocking joints have been extensively used in the past, it has been necessary to provide the interlocking joints with bolts, hooks, hinges, bonding agents between the interlocking joints, or the like to insure the fluid impervious nature of these materials. For some application, these materials have been satisfactory. However, the method of assembling many of these materials to provide a fluid impervious surface or lining is tedious and expensive and, in some instances, they have not provided an effective fluid impervious seal.

Accordingly an object of this invention is to provide a prefabricated, laminated lining suitable for lining salt water disposal pits, municipal water reservoirs, fluid causeways, ponds, roofs, canals, and other installations requiring an impervious lining.

Another object is to provide a tightly-fitted, composite lining comprising a plurality of prefabricated blocks interlocked in such a manner that the several blocks sustain each other through the entire lining which for all intents and purposes act as a single block.

Another object is to provide a novel and improved prefabricated lining comprising a plurality of prefabricated blocks arranged in interlocking association between two layers of fluid impervious material to form fluid impervious lining without resorting bolts, hooks, hinges, bonding agents between the interlocked blocks, calking, stripping, etc.

A further object is to provide a method for assembling a plurality of prefabricated, interlocking blocks to form a fluid impervious lining.

Other objects, advantages and features of our invention will become apparent to those skilled in the art from the following discussion, appended claims, and the drawings in which:

Figure 2 is a top plan view of a flooring or lining illustrating the manner in which a plurality of prefabricated blocks of Figure 1 are arranged in interlocking association;

Figure 3 is an elevational cross-section view of Figure 2 taken along the line 3—3;

Figure 4 is an enlarged view of a portion of Figure 3;

Broadly contemplated, we propose by the practice of our invention, to provide a prefabricated lining or lining comprising a plurality of prefabricated, laminated blocks disposed in a predetermined arrangement in the same plane, said blocks having their sides in direct interlocking association, which blocks are assembled by laying the blocks adjacent one another and interlocking or seating them together between two layers of fluid impervious material to provide a fluid impervious lining, as set forth hereinafter in detail. The blocks can be made of asphalt cement, catalytically blown asphalt, synthetic or natural rubber, pitch, plastics such as "Marlex" polyethylene and other polyethylene polymers, and the like. These materials may contain a filler or additive such as powdered rubber, mineral dust, fiber-glass, and the like. The blocks may be molded or stamped with an interlocking pattern along the edges in such a manner that the blocks are reversible and interchangeable. These blocks are covered on both top and bottom faces with fluid impervious layers of material such as kraft paper, fiber-glass, asbestos felt, and the like, which layers completely overlap the interlocking edges of the block. The top and bottom layers need not be made of the same material, e.g., the top can be kraft paper and the bottom made of felt.

Figure 1:
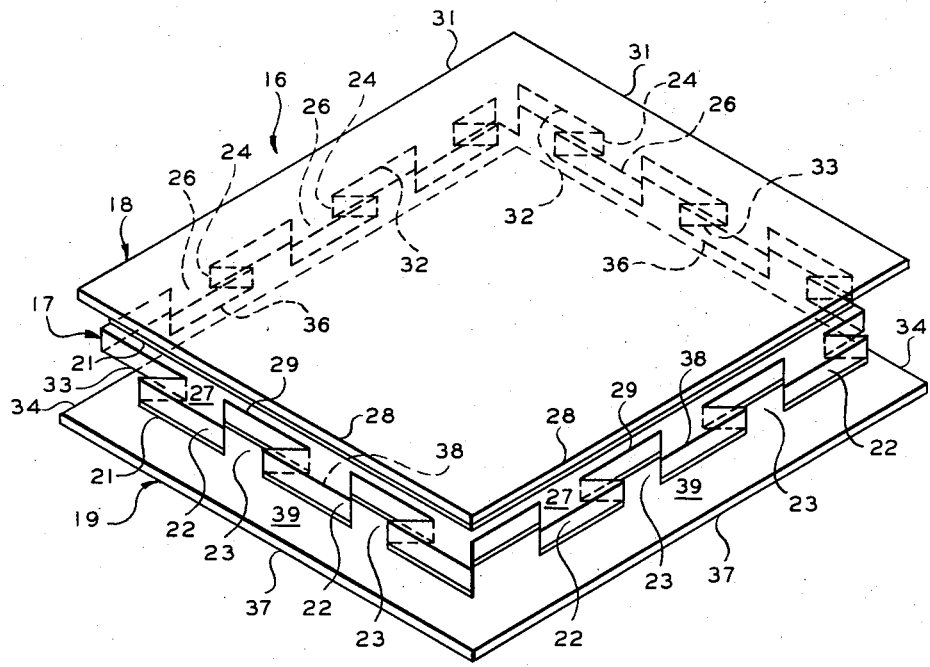
Figure 1 is an isometric view illustrating a prefabricated interlocking block.

Referring now to the drawings, and to Figure 1 in particular, a prefabricated, laminated block 16 is shown having a substantially prismatic shape comprising a center member or block 17, the upper and lower faces of which are in contact with an upper layer 18 and bottom layer 19 of fluid impervious material bonded thereto by adhesive material 21. The sides of the center block 17 are cut at spaced intervals to form on adjacent sides alternate tenons 22 and recesses 23, and on the other two adjacent sides alternate tenons 24 and recesses 26. In this manner, the opposed sides of the center block 17 are different in that the tenons of one side are aligned with the recesses of the other side, the purpose of which arrangement will be described hereinafter. The top layer 18 substantially covers all of the top face of the center block 17 except for exposed top portions 27. The two edges 28 of the top layer 18 are set back a small distance from the receding edges 29 of recesses 23. The other two edges 31 of the top layer 18 extend a substantial distance from the leading edges 32 of tenons 24 adjacent thereto. The two edge portions 31 of the top layer 18 thereby extending from two sides of the center block 17 comprise a top overlap. The bottom layer 19 substantially covers the bottom face of the center block 17 except the two bottom exposed portions 33 adjacent two sides of center block 17. The two edges 34 of bottom layer 19 are set back a small distance from the receding edges 36 of recesses 26. The other two edges 37 of bottom layer 19 extend a substantial distance from the leading edges 38 of tenons 22 adjacent thereto. The two edge portions 39 of bottom layer 19 thereby extending from the two sides of the center block 17 comprising a bottom overlap.

The purpose of the alternating tenons and recesses and the overlaps of Figure 1 became apparent from the perusal of Figure 2 which shows a plurality of prefabricated blocks interlocked with similar blocks adjacent thereto between top and bottom layers 18, 19 to provide a composite, fluid impervious lining 61. The tenons of one block are fitted tightly in the recesses of an adjacent block. The portions of top layer (partially cut away) and bottom layer material which extend from the sides of the center block of one prefabricated block overlap the set back edges of top and bottom layer material of an adjacent interlocked prefabricated block. This overlapping may be clearly seen in Figures 3 and 4. Although the interlocked blocks may provide to a limited degree an impervious seal due to the tight-fitted joints, the impervious nature of our prefabricated lining is ensured by the overlapping of the top and bottom layers. The overlaps are so situated as not to be directly over or above the interlocking joints but rather set back a small distance therefrom. Although the top and bottom surfaces as shown in Figure 3 of the composite lining are not smooth due to the overlaps, it was necessary in Figure 3 to provide the top and bottom layers with substantial thickness for purposes of illustration. The top and bottom layers are preferably of paper-thin thickness and for many applications of lining of this type the bulging of the overlaps is not objectionable.

In assembling a plurality of the prefabricated blocks of Figure 1 to form a composite lining 61 as illustrated in Figure 2, an adhesive material 62 can be applied to the exposed portions 27 of the center block 17 and to the adjacent surfaces of the overlapping portions of the top and bottom layers so as to provide tightly bonded overlaps, depending on the particular material utilized in making the center blocks. Suitable adhesive materials for this purpose include liquid asphalt cement, cutback asphalt cement, resins, and the like. If the center block material is made of asphaltic material bonding of the center member with the top and bottom layers in contact therewith can be accomplished by heating the same to effect the bonding, and an adhesive can be used to bond the various contacting layers of adjacent blocks.

One corner of each of the interlocked, prefabricated, laminated blocks in the composite lining 61 will be provided on each face thereof with four plies of top or bottom layer material 18, 19. However, since these layers may be made very thin, the small bulge resulting therefrom will not be objectionable in some applications of this type of composite lining.

Figure 5:
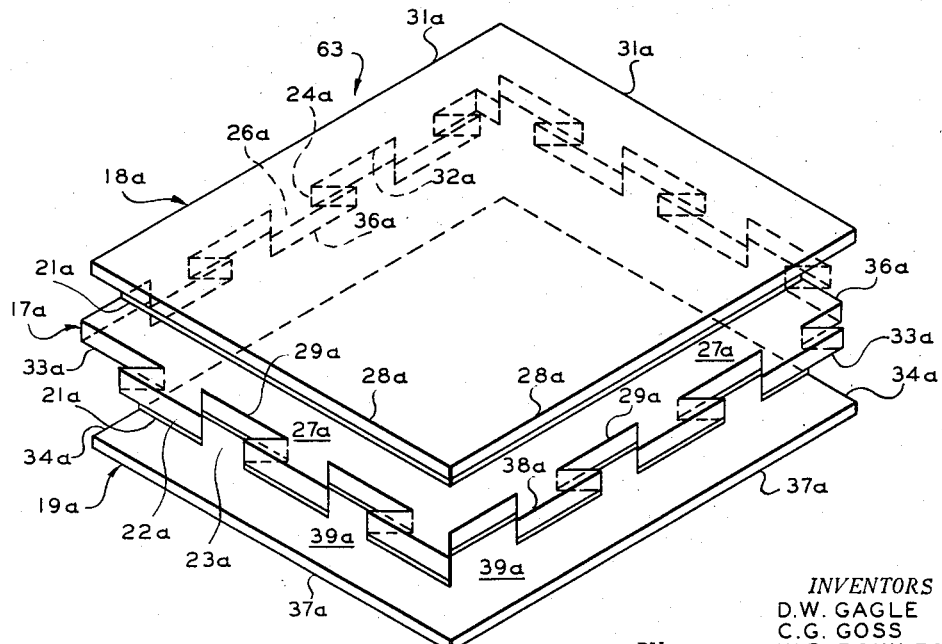
Figure 5 is an isometric view illustrating another embodiment of a prefabricated, interlocking block.
Figure 6:
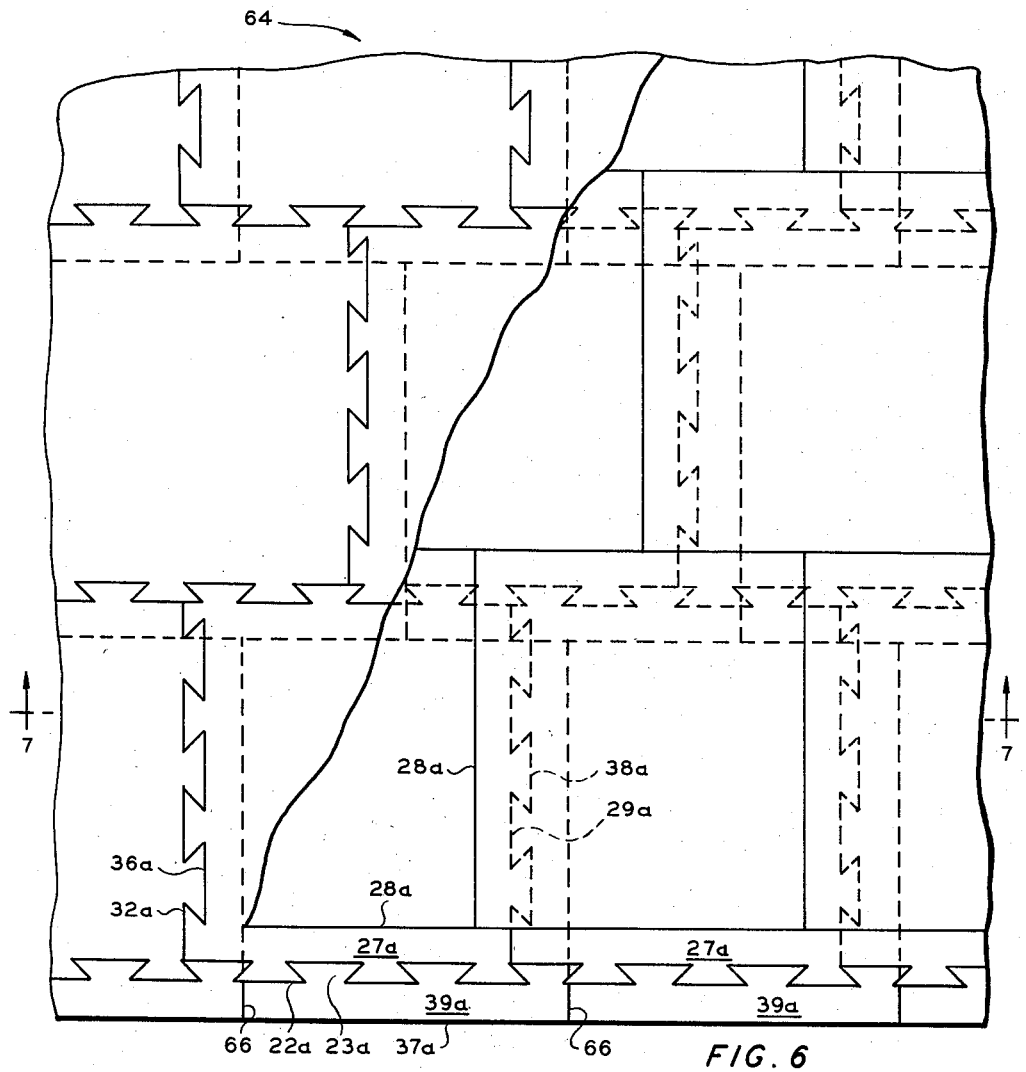
Figure 6 is a top plan view of a lining illustrating the manner in which a plurality of blocks shown in Figure 5 are staggeringly arranged in interlocking association.
Figure 7:
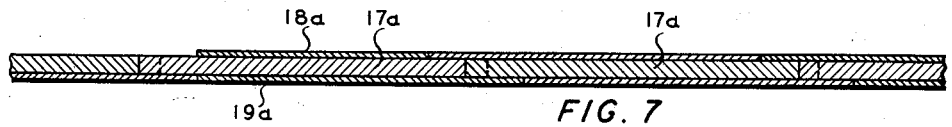
Figure 7 is an elevation cross-section view of Figure 6 taken along the line 7—7.
Figure 8:
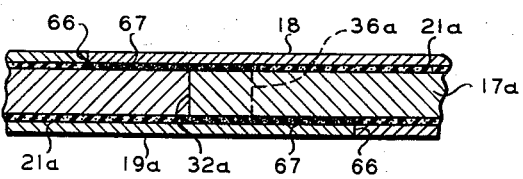
Figure 8 is an enlarged cross-section view of a portion of Figure 7.

Referring now to Figure 5 a modified prefabricated block 63 is shown, having a substantially prismatic shape, the center member or block 17a of which is substantially the same as the center block 17 of Figure 1. The receding edges 28a, 34a of the top and bottom layers 18a, 19a are set back a greater distance from the receding edges 29a, 36a of the adjacent recesses 23a, 26a, respectively than that of Figure 1. In Figure 6 a plurality of the prefabricated blocks 63 of Figure 5 are staggeringly arranged in interlocking association with adjacent blocks. In this composite lining 64 the extending edges 31a, 37a of the top layer 18a (partially cut away) and bottom layer 19a of the prefabricated blocks 63 do not overlap the receding edges 28a, 34a of the adjacent interlocked block but, rather, abut at common edge 66 the top and bottom layers of adjacent interlocked blocks. This modified composite lining 64 is thus provided with a smooth top and bottom face unobstructed by the overlapping bulges of the overlaps of the composite lining 61 of Figure 2. Thus, in those applications where a smooth surface is preferred this later embodiment of composite lining may be advantageously employed and the top and bottom layers 18a, 19a need not be of limited thickness. In assembling the prefabricated blocks 63 to form a composite lining 64 such as illustrated in Figure 6, an adhesive 67 can be applied to the portions 27a, 39a, depending on the particular material from which the center blocks are made, or heat may be applied as hereinbefore described to effect the bonding.

Figure 11:
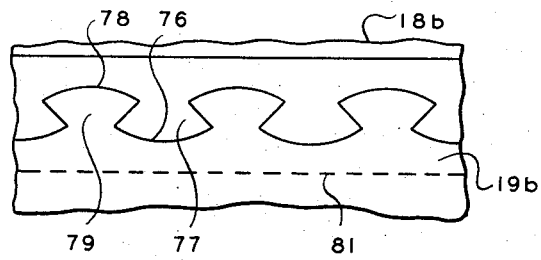
Figures 11 and 12 are partial top plan views of linings illustrating the manner in which a plurality of blocks having further modified interlocking joints are arranged in interlocking association.
Figure 12:
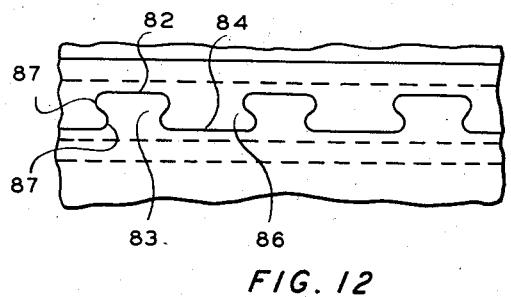
Figure 9:
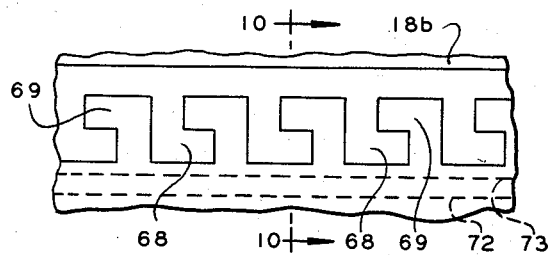
Figure 9 is a partial top plan view of a lining illustrating the manner in which a plurality of blocks having a modified interlocking association may be assembled.
Figure 10:
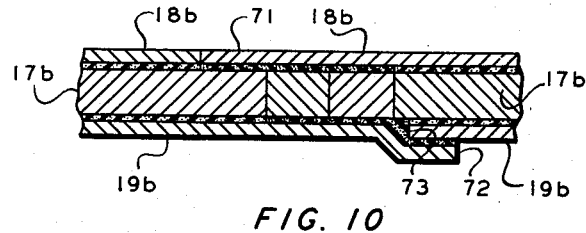
Figure 10 is an elevation cross-section view of Figure 9 taken along the line 10—10.

We do not propose to limit the interlocking recesses and tenons to any particular shape as illustrated by the modifications shown in Figures 9, 11, and 12. However, they should be of such configuration that the forces applied thereto will be of insufficient magnitude to cause displacement of the edges. In Figure 9 the alternating tenons 68 and recesses 69 are "L-shaped." The extending edges of top layers 18b of two adjacent blocks 17b abut at a common edge 71 and the extending edges 72 of the bottom layers 19b of the one block overlap the receding edge 73 of an adjacent block. The smooth top and the bottom surfaces provided with the overlaps of the composite lining of Figure 9 is clearly illustrated in Figure 10. The composite lining thus provided by this embodiment may be used in those applications where a smooth or planer top surface is preferred while the particular conformation of the bottom surface is unimportant.

While it is preferred to have the center block, or main member, provided with both top and bottom sealing layers, results of some value can be obtained in practicing this invention by adhesively bonding only one layer of sealing material on either the top or bottom faces of the center block or main member and this layer can either overlap or abut similar layers of adjacent interlocked blocks. Such embodiments may be advantageously employed in those applications where it is desirable to provide only one fluid impervious surface.

The shape of the alternating tenons and recesses of the prefabricated blocks of my invention may be modified as shown in Figure 11. The leading edge 76 of the tenons 77 and the receding edge 78 of the recesses 19 may be curved as shown. The extending edges of both the top and bottom layers 18b, 19b of adjacent blocks may abut at a common edge 81.

The alternating tenons and recesses of our prefabricated blocks, as shown in Figure 12, may be further modified by providing the receding edges 82 of the recesses 83 and the leading edges 84 of the tenons 86 respectively with rounded corners 87.

Although the prefabricated, laminated blocks of our invention have been illustrated in the form of parallelepipeds, our invention is obviously not limited to such configuration but can be made in the form of triangles, hexagonals, etc., or a combination thereof, and "prismatic" as used in this specification and the appended claims is to be understood as generic to the several configurations. According to the nature of the surfaces to be provided with the composite lining of our invention, the prefabricated blocks may also vary in thickness and length and can be somewhat yieldable. Relatively large surfaces or surfaces composed of relatively large units, may require prefabricated blocks sufficiently rigid and thick to withstand lateral pressures applied to the surfaces thereof without deforming the same. The resulting composite lining provided by our invention is, to all intents and purposes, a single, rigid, fluid impervious lining and because of the tight-fitted interlocking joints, the individual blocks will be retained in proper position, the several blocks sustaining each other through the entire lining.

The interlocking joints between adjacent blocks can be made more positively secure by making the width of the recesses a trifle smaller than the width of the corresponding tenons seated therein.

While this invention is of a relatively simple nature and various modifications thereof will become apparent to those skilled in the art without departing from the scope and spirit of the invention, it should be understood that the foregoing discussion and drawings have been set forth for illustrative purposes only and do not unduly limit our invention.

We claim:

1. A prefabricated, laminated block comprising a main member the top and bottom faces of which are respectively partially covered with top and bottom layers of sealing material bonded thereto, said main member having first adjacent sides provided with alternate tenons and recesses and second adjacent sides provided with opposing alternate tenons and recesses, said tenons and recesses adapted to interlock with corresponding alternate tenons and recesses of similarly shaped main members of other blocks aligned in the same plane, said top layer having first adjacent edge portions which are set back from said first adjacent sides so as to expose the top faces of the tenons and recesses of said first adjacent sides, said top layer having second adjacent edge portions which project from said second adjacent sides, said bottom layer having first adjacent edge portions which project from said first adjacent sides and second adjacent edge portions which are set back from said second adjacent sides so as to expose the bottom faces of the tenons and recesses of said second adjacent sides, said edge portions of said layers which project from said sides overlapping the edges defining said tenons and recesses.

2. A prefabricated laminated block of substantially prismatic form comprising a center member the top and bottom faces of which are respectively partially covered with top and bottom layers of sealing material bonded thereto, said center member having first adjacent sides provided with alternate tenons and recesses and second adjacent sides provided with opposing alternate tenons and recesses, said tenons and recesses adapted to interlock with corresponding alternate tenons and recesses of similarly shaped adjacent center members of other blocks aligned in the same plane, said top layer having first adjacent straight edge portions which are set back a small distance from said first adjacent sides thereby exposing the top face of the alternating tenons and recesses adjacent thereto, said top layer having second straight edge portions which project from said second adjacent sides a distance greater than that said first edge portions are set back, said bottom layer having first adjacent straight edge portions which are set back a small distance from said second adjacent sides thereby exposing the bottom face of the alternating tenons and recesses adjacent thereto, and said bottom layer having second adjacent straight edge portions which project from said first sides a distance greater than that said first edge portions of said bottom layer are set back, said edge portions of said layers which project from said sides overlapping the edges defining said tenons and recesses.

3. A prefabricated, laminated block of substantially prismatic form comprising a center member the top and bottom faces of which are respectively partially covered with top and bottom layers of sealing material bonded thereto, said center member having first adjacent sides provided with alternate tenons and recesses and second adjacent sides provided with opposing alternate tenons and recesses, said tenons and recesses adapted to interlock with corresponding tenons and recesses of similarly shaped adjacent center members of other blocks aligned in the same plane, said top layer having first adjacent straight edge portions which are set back from said first adjacent sides thereby exposing the top face of the alternating tenons and recesses adjacent thereto, said top layer having second adjacent straight edge portions which project from said second adjacent sides, said bottom layer having first adjacent straight edge portions which are set back from said second adjacent sides thereby exposing the bottom face of the alternating tenons and recesses adjacent thereto, and said bottom layer having second adjacent straight edge portions which project from said first adjacent sides, the distance said layers are set back from said sides being substantially the same distance said layers project from said sides, said edge portions of said layers which project from said sides overlapping the edges defining said tenons and recesses.

4. A prefabricated, laminated block of substantially prismatic form comprising a center member the top and bottom faces of which are respectively partially covered with top and bottom layers of sealing material bonded thereto, said center member having first adjacent sides provided with alternate tenons and recesses and second adjacent sides provided with opposing alternate tenons and recesses, said tenons and recesses adapted to interlock with corresponding tenons and recesses of similarly shaped adjacent center members of other blocks aligned in the same plane, said top layer having first adjacent straight edge portions which are set back from said first adjacent sides thereby exposing the top face of the alternating tenons and recesses adjacent thereto, said top layer having second adjacent straight edge portions which project from said second adjacent sides, said bottom layer having first adjacent straight edge portions which are set back from said second adjacent sides thereby exposing the bottom face of the alternating tenons and recesses adjacent thereto, and said bottom layer having second adjacent straight edge portions which project from said first adjacent sides, the distance said first edge portions of said top layer are set back from said first adjacent sides being substantially the same as the distance said second edge portions of said top layer project, and the distance said second edge portions of said bottom layer project being substantially greater than the distance said first edge portions of said bottom layer are set back, said edge portions of said layers which project from said sides overlapping the edges defining said tenons and recesses.

5. A composite, prefabricated laminated lining comprising a plurality of blocks of substantially prismatic shape disposed in predetermined arrangement, each of said blocks comprising a center member the top and bottom faces of which are respectively partially covered with top and bottom layers of sealing material bonded thereto, said center member having first adjacent sides provided with alternating tenons and recesses and second adjacent sides provided with alternating tenons and recesses, said tenons and recesses interlocked with corresponding tenons and recesses of similarly shaped adjacent center members of other blocks aligned in the same plane, said top layer having first adjacent edge portions which are set back from said first adjacent sides so as to expose the top faces of the tenons and recesses of said first adjacent sides, said top layer having second adjacent edge portions which project from said second adjacent sides, and said bottom layer having first adjacent edge portions which project from said first adjacent sides and second adjacent edge portions which are set back from said second adjacent sides so as to expose the bottom faces of the tenons and recesses of said second adjacent sides, said edge portions of said layers which project from said sides overlapping and sealing the interlocks between said blocks.

6. A composite, prefabricated laminated lining according to claim 5 wherein the projecting second and first edge portions of respective said top and bottom layers overlap the set back first and second edge portions of the respective top and bottom layers of an adjacent block in interlocked association.

7. A composite, prefabricated laminated lining according to claim 5 wherein the set back edge portions of said top and bottom layers abut the projecting edge portions of respective top and bottom layers of an adjacent block in interlocked association.

8. A composite, prefabricated laminated lining according to claim 5 wherein the set back edge portions of said top layer abut the projecting edge portions of the top layer of an adjacent block and projecting edge portions of said bottom layer overlap the set back edge portions of the bottom layer of said adjacent block.

References Cited in the file of this patent

UNITED STATES PATENTS

| | | |
|---|---|---|
| 2,099,149 | Turnquist | Nov. 16, 1937 |
| 2,176,778 | Terrell | Oct. 17, 1939 |
| 2,308,294 | McCorkle et al. | Jan. 12, 1943 |

FOREIGN PATENTS

| | | |
|---|---|---|
| 50,690 | France | 1940 |
| | (Addition to No. 854,839) | |